(12) United States Patent
Travis

(10) Patent No.: US 6,300,986 B1
(45) Date of Patent: Oct. 9, 2001

(54) FLAT-PANEL DISPLAY

(76) Inventor: Adrian Robert Leigh Travis, Wrangaton House, Wrangaton, South Devon, T010 9HH (GB)

( * ) Notice: Subject to any disclaimer, the term of this patent is extended or adjusted under 35 U.S.C. 154(b) by 0 days.

(21) Appl. No.: 09/269,727

(22) PCT Filed: Oct. 2, 1997

(86) PCT No.: PCT/GB97/02710

§ 371 Date: Apr. 2, 1999

§ 102(e) Date: Apr. 2, 1999

(87) PCT Pub. No.: WO98/15128

PCT Pub. Date: Apr. 9, 1998

(30) Foreign Application Priority Data

Oct. 2, 1996 (GB) .................................................. 9620486

(51) Int. Cl.[7] .................................................. G02F 1/1335
(52) U.S. Cl. ..................................... 349/5; 359/7; 359/35
(58) Field of Search .............................. 349/5, 11; 359/7, 359/10, 11, 17, 28, 35

(56) References Cited

U.S. PATENT DOCUMENTS 4,930,849    6/1990    Tanaka .

FOREIGN PATENT DOCUMENTS

| 0 635 986 | 1/1995 | (EP) . |
|---|---|---|
| 2 206 763 | 7/1988 | (GB) . |
| WO 93 09450A | 5/1993 | (WO) . |
| WO 9603671A1 | 2/1996 | (WO) . |

OTHER PUBLICATIONS

Jouko Viitanen et al: "Fiber Optic Liquied Crystal Displays" SPIE High–Definition Video, vol. 1976, Jan. 1, 1993, pp. 293–302, XP000534173 see paragraph 2; figure 1.

Primary Examiner—James A. Dudek
(74) Attorney, Agent, or Firm—Nixon & Vanderhye P.C.

(57) ABSTRACT

A video display for two or three dimensions has a flat liquid-crystal screen 2 which ejects light from the plane at a selectable line 3. One or, in the case of a 3-D display, several video projectors 1 project a linear image into the plane from an edge. A complete image is written on the screen by addressing the line with appropriate images as it is scanned down the screen. To screen a three-dimensional image the video projectors, each projecting an image as seen at a slightly different angle, combine to constitute a three-dimensional display which produces a three-dimensional image that is one line high.

12 Claims, 7 Drawing Sheets

FLAT-PANEL DISPLAY

This invention relates to displays, particularly to the video display of three-dimensional images.

Video displays commonly present moving two-dimensional images for use in television and as computer monitors. It is becoming possible to display three-dimensional images on such displays, and a variety of designs have been proposed.

It is well known that holograms are capable of displaying three-dimensional images. A crude hologram can be written by a high-resolution liquid-crystal display, so such displays are capable of displaying video three-dimensional images. But it is difficult to make liquid-crystal displays with pixels less than five microns wide, and holograms produced on such displays have a narrow field of view.

Just as video two-dimensional images can be displayed by raster-scanning a two-dimensional screen, a three-dimensional image can be displayed by raster-scanning a three-dimensional volume. One way of doing this is to scan a volume of a suitable material with a pair of laser beams. If the material is transparent to both laser beams, and if the material emits light at any point where the laser beams intersect, then it is possible to cause the point of intersection of the laser beams to sweep out the whole volume so as to write the three-dimensional image. The problem with displays like this is that the images which they produce are necessarily transparent, i.e. there is no provision for images at the front of the volume to block light from images at the rear.

More common is the technique whereby a conventional video display screens left and right views alternately of a three-dimensional object, and the viewer wears a pair of spectacles which make one of the pair visible to each eye. If this is done quickly enough for flicker to be imperceptible, the viewer sees a stereo image which allows the perception of depth.

Spectacles however get lost. An alternative system is to place an array of lenslets over a two-dimensional display and provide two pixels under each lenslet. Provided the viewer is positioned correctly it can be arranged that one pixel under each lenslet is imaged to the viewer's right eye and the other to the viewer's left eye. The viewer then sees a stereo image without having to wear spectacles.

The difficulty with screening only two views in this way is that the viewer must keep his head in the correct position. If more than two pixels are provided under each lenslet it becomes possible to screen several views of the three-dimensional image. This has the dual advantage that the viewer can see a stereo image over a wider range of positions, and that the viewer can inspect the three-dimensional image from a variety of angles.

For the lenslet system to work, the two-dimensional display must have a high resolution and this makes construction of the display difficult. A different approach is to adapt a rear-projection two-dimensional display which commonly comprises a video projector and translucent screen. If the translucent screen in such a display is exchanged for a lens then light from the video projector will as before form a video image which will lie in the plane of the lens, but after passing through the lens the light will converge to a zone at some point in space which in fact is an image of the video projector. If the viewer puts one eye in this zone they will be able to see a two-dimensional image but only with that eye. Put another video projector adjacent to the first and a view can be displayed to the viewer's other eye, and indeed further projectors can be added to display more views to adjacent positions into which the viewer's head might stray. Such a system is shown in FIG. 1. This system can be assembled from projectors of conventional resolution, but the projectors must be positioned with great precision, and the projector lenses must be designed so that the aperture stop of each lens is directly adjacent to those of neighbouring lenses.

An alternative approach is to use a single video projector and lens, but to place a multi-element shutter in front of the video projector lens, as shown in FIG. 2. As before, light from the video projector forms a video image on the lens and then is focused by the lens to a zone, but the zone now comprises an image of the video projector with the shutter in front. By choosing a lens with a different focal length the zone can be expanded until each element of the shutter is imaged to a size suitable for one eye so that if only one shutter is open and all others are closed, the image on the lens is visible to a single eye. Views of a three-dimensional image can be screened one by one on the video projector and a different element of the shutter opened and closed for each view in such a way that provided the sequence is repeated quickly, the viewer sees a three-dimensional image. The problem with this system is that it wastes light and is bulky.

Yet another approach (FIG. 3) is to use a liquid-crystal display which is illuminated in such a way that it is visible from only one position at any time. Views of the three-dimensional image can be screened one by one on the liquid-crystal display, and the direction of illumination switched as each view is screened in such a way that each view is visible to a different area. Provided this is repeated quickly enough the flicker of each view need not be perceptible, and the viewer sees a three-dimensional image much as with the lenslet system. A display of this type is shown in the inventor's earlier patent GB-B-2206763. Switching the illumination of a liquid-crystal display in this way means that the optics need not be precisely registered, and the liquid-crystal display need not have a high resolution. A switched illumination scheme requires a liquid-crystal display with a high frame rate and such displays have been demonstrated. But like most modern liquid-crystal displays a matrix of transistors is needed to make a high frame rate display, and it is expensive to manufacture even small versions of such displays.

Liquid-crystal displays are not the only flat-panel displays which are expensive to manufacture. Most flat-panel displays comprise a matrix of individually controlled pixels and since there may be almost a million of these great care is needed to ensure that none fails. The screen of a cathode ray tube by contrast is a uniform layer of material which, because it has no detail or structure, rarely fails and therefore makes the cathode ray tube rather simple to construct. It is because the picture is built up by raster-scanning that the screen of a cathode ray tube can be so unstructured, and it appears to have been assumed that one cannot raster-scan a flat-panel display because the display needs a certain depth for the scanning beam.

However if a cathode ray tube is designed to produce a video image composed of a single line of pixels it can be made essentially flat. Indeed any video system which is designed to produce a single line of pixels can be made flat. With such flat systems all the optical components can be usually be confined within the core of a slab waveguide, and even if the system is long or wide it can be packed behind a flat screen simply by using mirrors to fold the optical layout. All that is needed is some device at the end of the optical system to expand the height of the display in order to restore the lost dimension.

Of particular interest here are video projectors and three-dimensional displays. A video projector is a device which projects light that focuses to form a video image at some point in space, and a one-line video projector is for the purposes of this document defined to be a video projector which writes a video image comprising a single line of pixels. Similarly a three-dimensional display is a device capable of displaying a video three-dimensional image, and a one-line three-dimensional display is for the purposes of this document defined to be a three-dimensional display which produces an image that is a single line high.

According to the present invention there is provided a flat-panel display comprising means for modulating the intensity and direction of a ray, a flat layer or panel which is not opaque to the ray, the modulating means being arranged to direct the ray into a side of the panel and the panel being adapted to enable the emission of light at the point where the ray intersects a selected zone of the panel, and means for selecting the zone.

The invention can be used to make a 2-D display which is simply scanned line by line in much the same way as, say, a CRT screen, each line constituting the respective zone and being produced by a corresponding modulation of the preferably single-line modulating means. Here the selected zone need only scatter the light.

Preferably however the invention is used to make a 3-D display where not only the position on the plane at which light is emitted is significant, but also its direction. To this end the modulating means can consist of several individual modulators, each capable of generating a two-dimensional image, for instance by multiplexing of single-line components as previously, and each injecting this image into the panel at a slightly different angle. If the emission from the panel is at an angle corresponding in a suitable way to the angle of entry then the different views projected can be made to correspond to views from the angles in question and a 3-D effect is obtained.

For a better understanding of the invention embodiments of it will now be described by way of example with reference to the accompanying drawings, in which.

Figure 1:
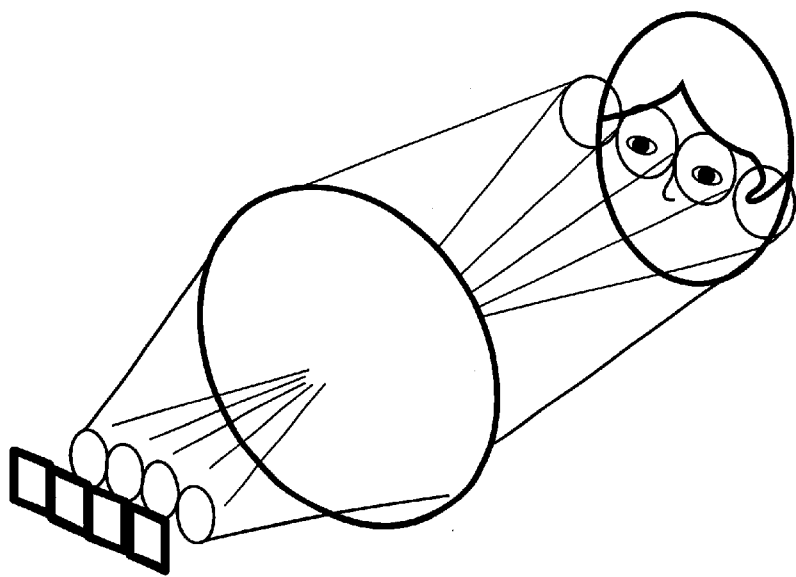
FIG. 1 shows a previous way of making a three-dimensional display from a lens and several video projectors.
Figure 2:
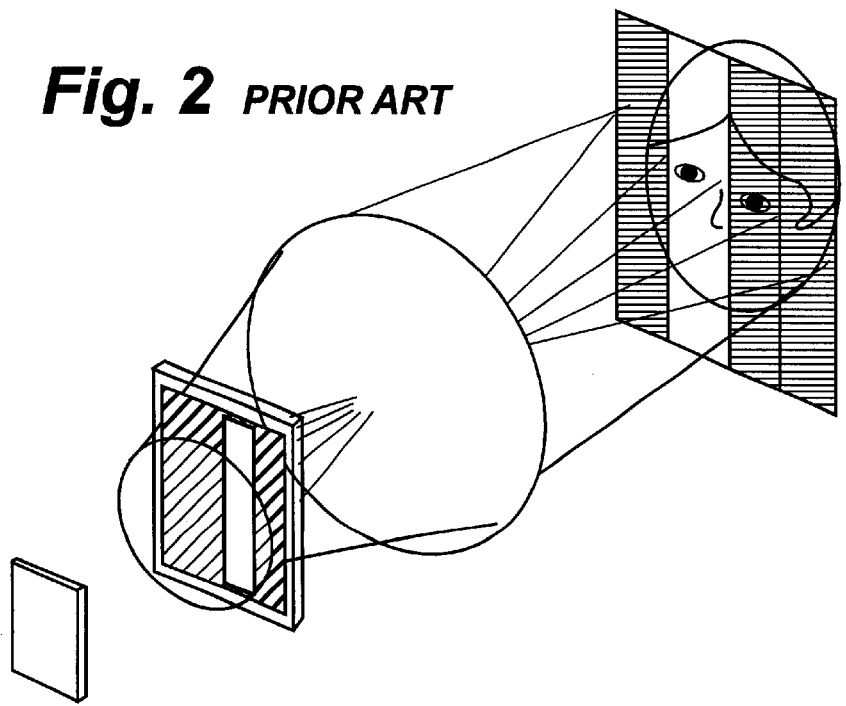
FIG. 2 shows a previous way of making a three-dimensional display from a lens, a high frame-rate video projector, and a liquid-crystal shutter.
Figure 3:
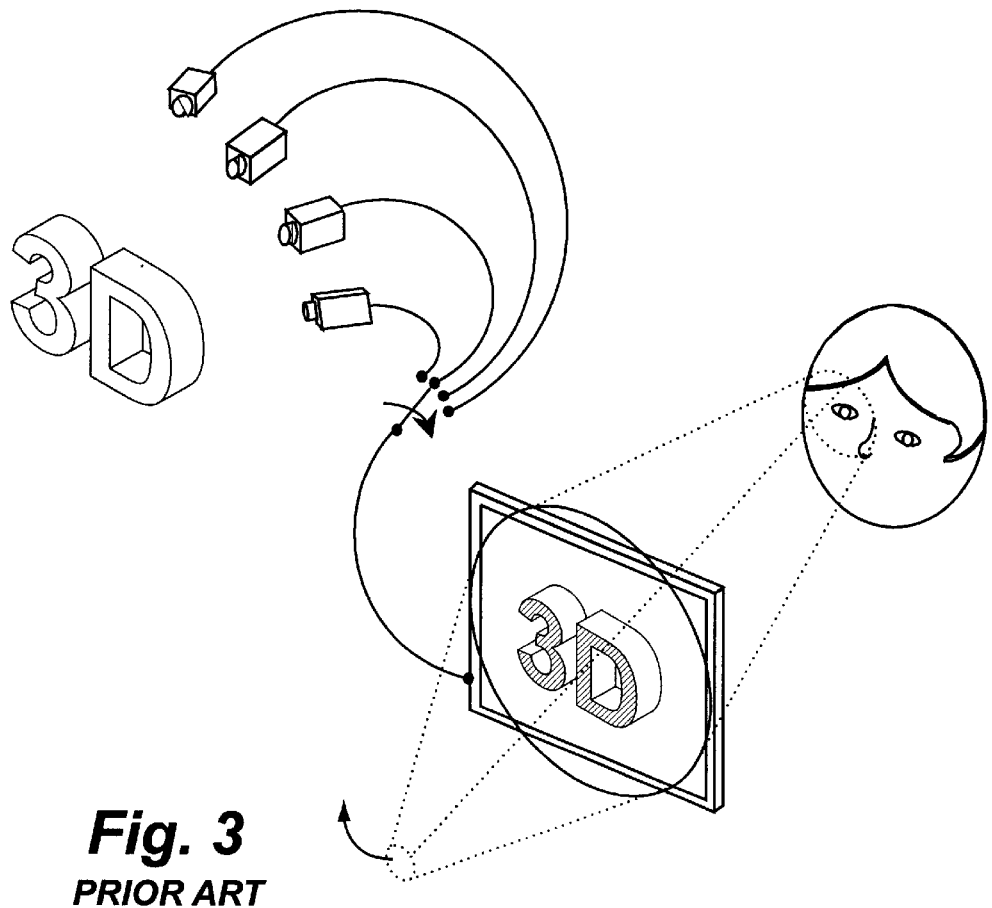
FIG. 3 shows a previous way of making a three-dimensional display from a lens, a high frame-rate liquid-crystal display and a scanning spot source of light.
Figure 4:
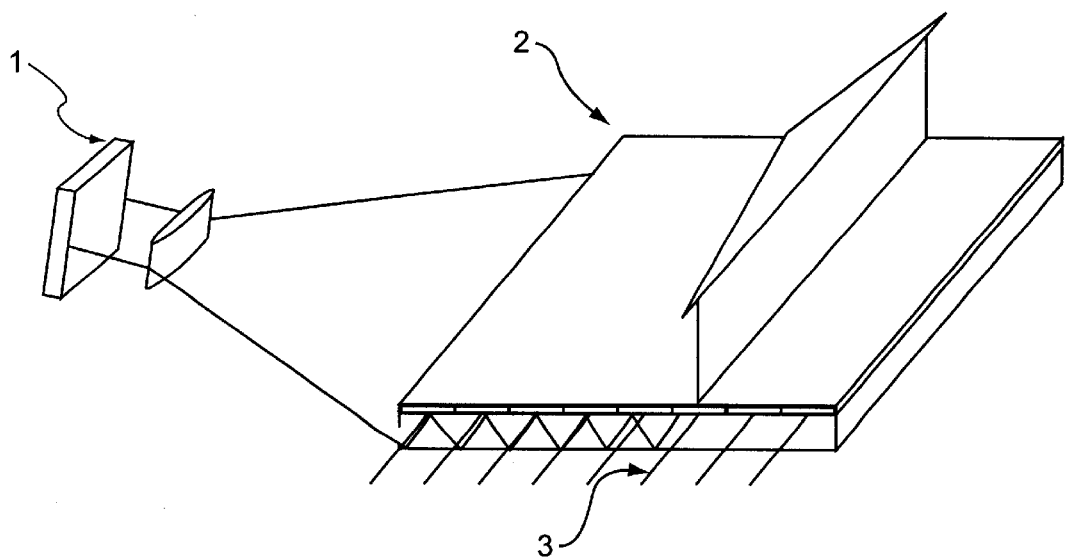
FIG. 4 shows a flat-panel display representing a first embodiment of the invention, which screens a two-dimensional image.

Referring to FIG. 4, the display comprises a one-line video projector 1 including a display panel 18 and a projection lens 20, a panel 2, capable of displaying a multiplicity of lines input from the video projector one at a time over its area, and means 3 for selecting one of the multiplicity of parallel lines on the panel. The panel 2 may be a liquid-crystal panel addressable in lines 3 perpendicular to the oncoming beam.

A picture is written line by line onto the panel by selecting one line at a time of the liquid-crystal panel 2 and illuminating the line with the appropriate pattern of light from the one-dimensional video projector 1.

Figure 5:
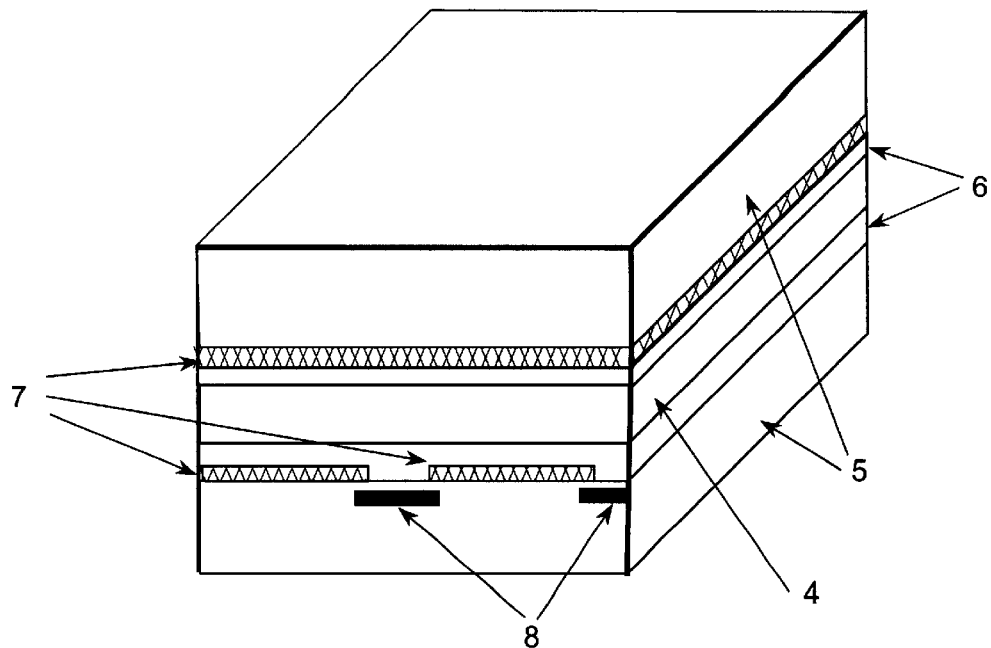
FIG. 5 shows a close-up of the liquid-crystal panel used in the flat-panel display of FIG. 4.

The liquid-crystal panel 2, as shown in FIG. 5, is made of a liquid-crystal layer 4 between upper and lower glass plates 5. It acts not as a display but as a slab waveguide with liquid crystal 4 on one side of the lower glass slab 5b and air on the other. Light from the one-dimensional video projector 1 is shone into one edge of the liquid-crystal panel 2, namely into the lower slab 5b, and is emitted from its upper face when the light intersects whichever one of the lines on the panel has been selected by the means 3 for line selection.

The liquid-crystal here is ferro-electric, for example, and is sandwiched in the conventional way between the two slabs of glass 5. The angle at which light L is injected into the rear slab 5b and the refractive indices of it and the liquid crystal 4 are chosen in such a way that in one state the liquid crystal 4 reflects light by total internal reflection and in the other state a substantial proportion of the light escapes through the upper slab 5a to be directed towards the viewer.

At the interfaces between liquid crystal 4 and slab 5 there is the usual alignment layer 6 and layer of transparent conductor 7. The latter in this instance is patterned and electronically controlled so that lateral lines of the liquid crystal 4, perpendicular to the incoming ray, can be switched. These lines would normally be horizontal as presented to a viewer. Furthermore reflector means 8 must be provided so that light is permanently reflected from spaces between adjacent lines of the lower transparent conductor 7. The upper conductor 7a is here continuous, though it would be possible to reduce the number of address lines needed by a multiplexing scheme in which the upper conductor was also divided into areas each addressing a group of lower electrode lines.

In use the LC panel 2 is addressed line by line, while for each line a one-dimensional series of points corresponding to the desired picture is produced by the projector 1. The light from the projector, thus modulated, passes through the slab until it reaches the row currently addressed, whereupon it escapes, as shown by the broad arrow in FIG. 4. This appears to the viewer as a modulated line. By scanning the surface of the plane of the liquid-crystal panel a 2-dimensional image is built up, at the end of which the next frame starts.

An undesirable aspect of this display is that the one-line video projector 1 must be far from the screen if there is not to be significant key-stone distortion of the image. This can be resolved by placing a lens 9 adjacent to the liquid-crystal panel and putting the video projector 1 approximately in the focal plane of the lens 9 (compare FIG. 6). A further feature of the display of FIG. 4 is that the picture has a narrow field of view, because light escapes only at one angle. However, the field of view can be increased simply by placing a translucent screen 10 between the viewer and the panel 2 and adjacent to the panel 2.

Figure 6:
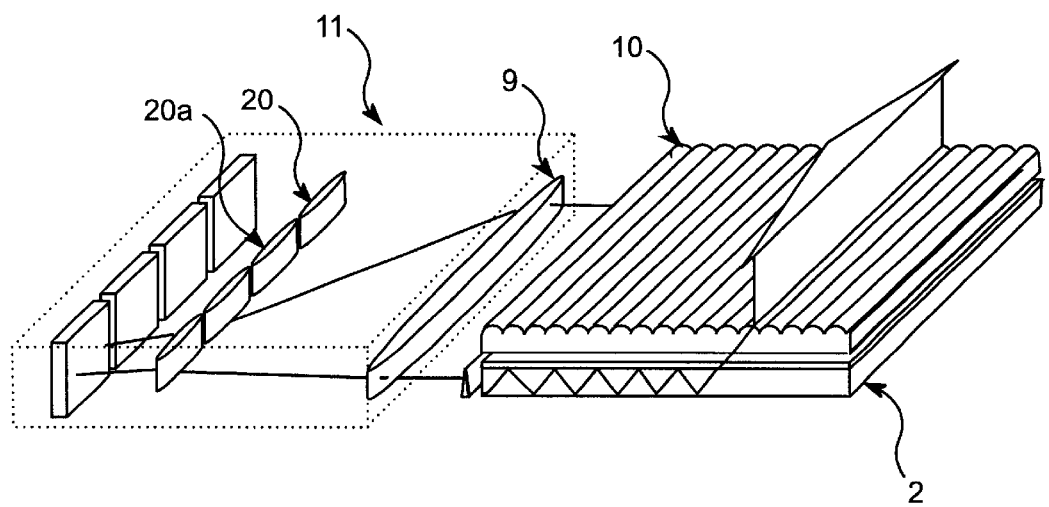
FIG. 6 shows a flat-panel display which screens a three-dimensional image, as a second embodiment.
Figure 7:
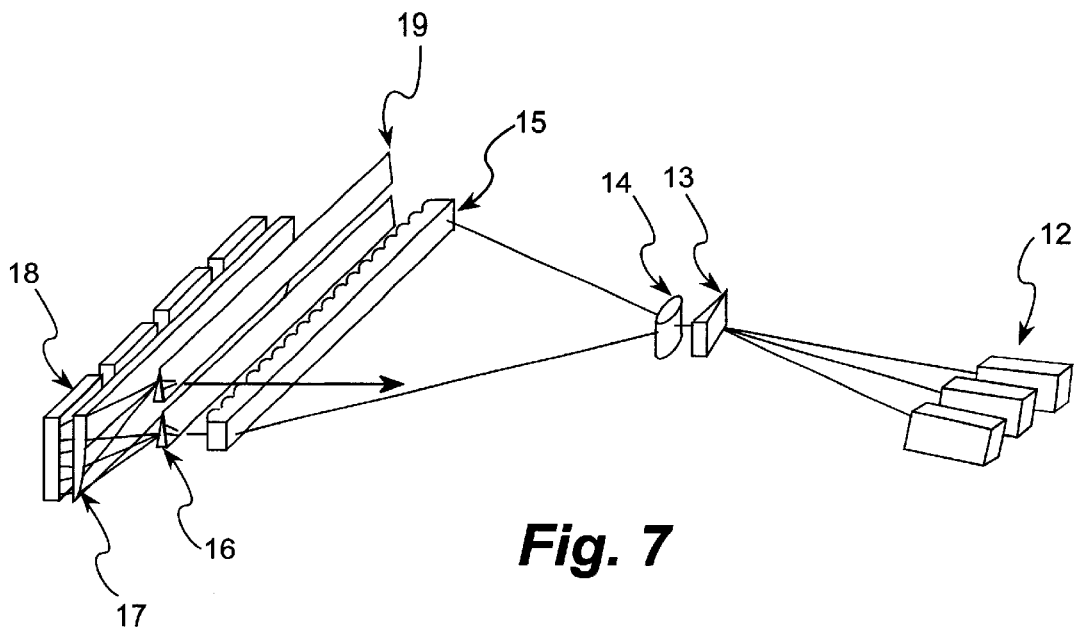
FIG. 7 shows the construction of the several one-line video projectors used in the flat-panel display of FIG. 6.

The narrow field of view can instead be conveniently turned to our advantage so as to produce a three-dimensional display. Further embodiments of the invention will therefore be described in which there is provided a flat-panel display capable of screening a three-dimensional image. In FIGS. 6 and 7 the display comprises a one-line three-dimensional display 11, a liquid-crystal panel 2 and means 3 for selecting a line on the liquid-crystal panel. In general, similar parts are given the same reference numerals.

The one-line three-dimensional display or source 11, partially shown in FIG. 6, comprises a lens 9 and several one-line video projectors 1, here shown magnified, approximately in the focal plane of the lens 9. The number of projectors depends on the application; ideally for, say, a 1° resolution in angle and an adequately wide field of view there should be eighty projectors, all in a line. As shown in FIG. 7, the array of one-line video projectors 1 is formed by an assembly consisting of red, green and blue lasers 12, a colour combiner 13, a cylindrical expansion lens 14, an array of cylindrical lenslets 15, a colour splitter 16, a cylindrical condenser lens 17, one liquid-crystal display 18 for each projector 1, a colour combiner 19 and one generally rectangular cylindrical projection lens 20 for each projector 1. The one-line video projectors 1 are arranged so that each edge of the aperture of each cylindrical projection lens 20 coincides with an edge of the aperture of the adjacent lens 20a. FIG. 6 also shows a one-dimensional prism 31 used for directing the light into the slab at the correct near-TIR-maximum angle.

In use, light from the lasers 12 is combined into a single beam by the colour combiner 13 and then expanded in the plane of the display by the cylindrical expansion lens 14. The array of cylindrical lenslets 15 behaves like a screen which is translucent in the plane of the display but transparent orthogonal to the plane, so that light is scattered within the plane. The light is then split by the colour splitter 16 into the three separate colours and passes through the cylindrical condenser lens 17 onto each liquid-crystal display 18, where it is modulated. The display 18 contains mirror surfaces which reflect the light back through the cylindrical condenser lens 17 which condenses the three colours to the colour combiner 19, where they are combined into the cylindrical projection lenses 20.

Each LC display element 18 is made up of a number of pixels in the form of columns, the number of columns corresponding to the number of pixels across the plane of the display. The display on each display element 18 corresponds to a view from a particular angle, or to a one-line sample of that view. The corresponding lens 20 spreads the reflected light from the display elements 18 towards the collimating lens 9, which directs the beam into the panel at an angle to the axis of the system. The relevant line of the 2-D waveguide 2 that is activated at any given time then extracts the input from each LC element 18 at an angle corresponding to its incoming angle. Hence as the panel 2 is observed a different view is seen depending on the angle across the panel, i.e. in the plane of the panel, perpendicular to the axis of the system (bottom left to top right in FIG. 6).

Normally 3-D displays require the 3-D effect only across the view, not up and down. A diffuser screen 10 is therefore applied which is like the screen in FIG. 4 in that it scatters or spreads light up and down (in elevation), so that the images can be viewed at whatever height the viewer is located, but unlike that screen conserves angle in azimuth (across the panel), to achieve the 3-D effect. The drawing of the screen 10 schematically shows corresponding cylindrical lenslets to achieve this effect, though in practice the lenslet side would be the underneath side, adjacent to the panel 2.

The number of wire connectors in this system will be large if a wire connection is made to every pixel of the one-line video projectors 1. Instead the liquid-crystal display 18 in each one-line video projector 1 comprises a two-dimensional liquid-crystal array with a back-plane of digital silicon transistors that can demultiplex digital signals from a few wire connections to the many liquid-crystal pixels. Each column of the liquid-crystal display 18 is conceptually split into three—one column for each colour—and grey scale is achieved by altering the size of the transparent area within each column.

In a conventional three-dimensional display which comprises a lens and video projectors it is difficult to make either edge of the aperture of each projection lens coincide with the aperture of the adjacent lens. This is because if the quality of the three-dimensional image is to be reasonable the lenses must also have a low F-number and wide field of view. To make the lenses 20 for this embodiment a layer of photoresist is placed on a slab of low-refractive-index glass. The photoresist is patterned, developed and etched and the exposed areas are filled with material of a different refractive index. A second slab of low refractive index glass is placed on top and the result is a slab waveguide whose core contains optical elements. The optical elements may be a series of aspheric profiles, or a two-dimensional hologram, either of which has the ability to provide good imaging properties at low cost.

A problem with the three-dimensional display just described is that the image from each video projector 1 has a single focal line, which can coincide exactly with only one line on the liquid-crystal panel 2. This will lead to image anomalies and it is better if the video projectors 1 refocus on each line of the panel 2 as it becomes transparent.

Figure 8:
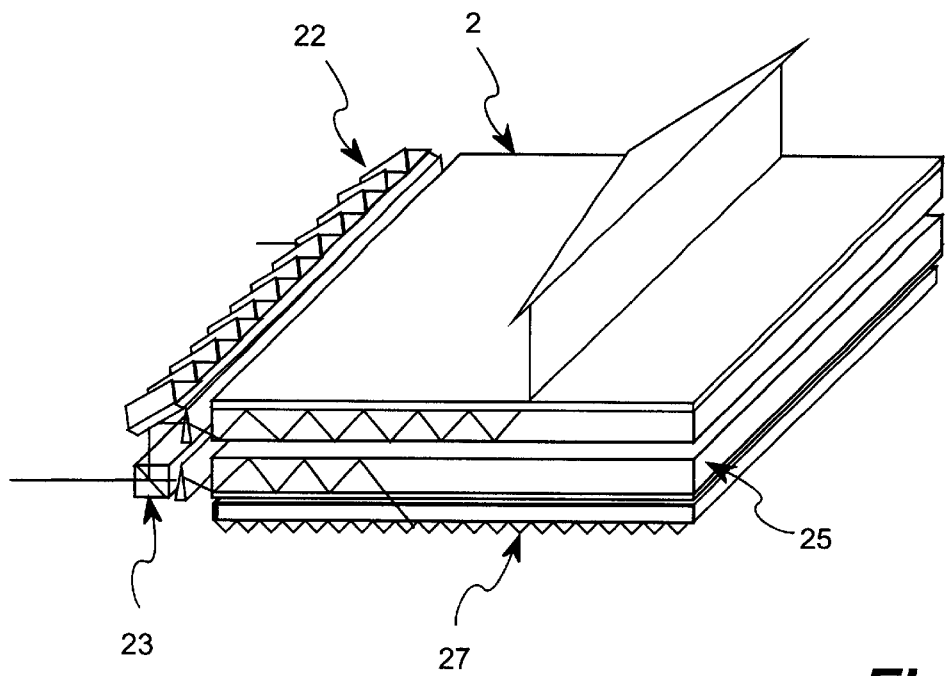
FIG. 8 shows a way of creating a variable optical path length.
Figure 9:
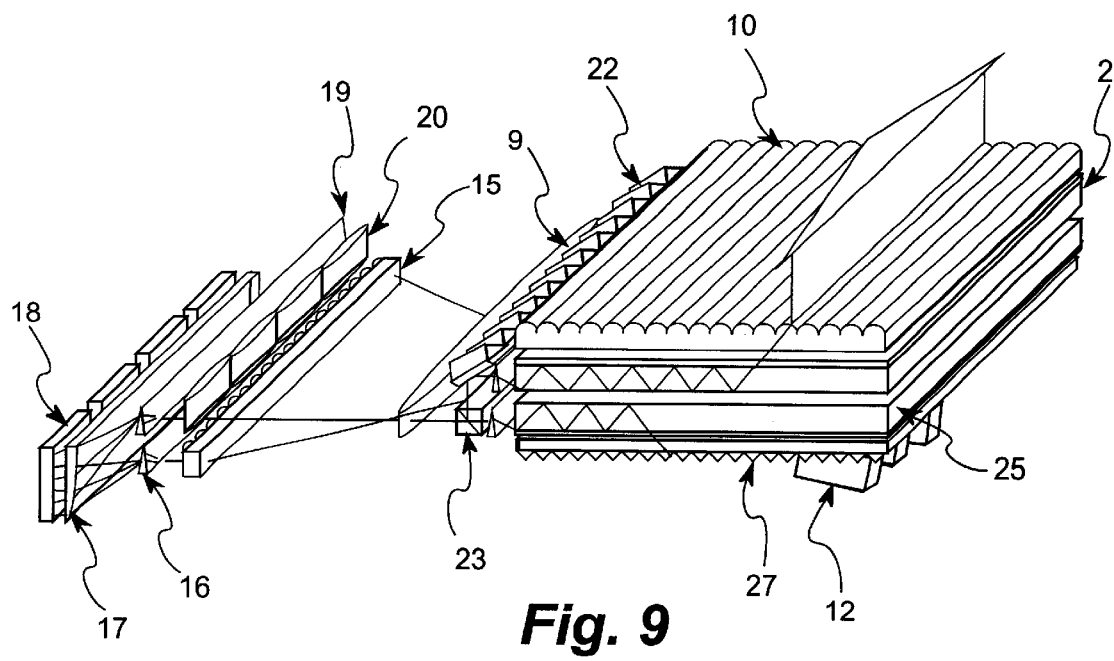
FIG. 9 shows a third embodiment being a flat-panel display with a variable optical path length which screens a three-dimensional image.

A further embodiment of the invention with this in mind is therefore shown in FIGS. 8 and 9. Here there is provided a flat-panel display capable of screening a three-dimensional image free of the anomalies described. The display comprises a one-line three-dimensional display 11, a medium 21 of variable optical path length, a first one-dimensional retroreflector 22, a liquid-crystal panel 2 and means 3 for selecting a line on the liquid-crystal panel 2.

The medium of variable optical path length 21 comprises a polarising beam splitter 23, a quarter-wave plate 24, a second liquid-crystal panel 25 underneath the first, means 26 for selecting a line on the second liquid-crystal panel and a second one-dimensional retroreflector 27.

In use, light from the lasers 12 passes through elements 13, 14, 15, 16 and 17 and is reflected by the LCDs 18 through element 19. The light then passes through elements 20 and 9, and into the beamsplitter 23. Light is transmitted by the polarising beam splitter 23 and through the quarter-wave plate 24 into one edge of the liquid-crystal panel 25. One glass slab of the liquid-crystal panel 25 is configured to act as a wave-guide, and light is freed from the waveguide at whichever line is selected. The one-dimensional retroreflector 27 is positioned so that light is retroreflected back along its path into the guiding slab of the liquid-crystal panel 25 as far as its forwards or axial direction is concerned, while the component of the light in the direction that is orthogonal to the plane of retroreflection is simply reflected. The light then passes back through the quarter wave plate 24 and, its polarisation by this stage reversed, is reflected by the polarising beam-splitter 23 onto the one-dimensional retroreflector 22 and via a further prism into the slab.

The one-dimensional retroreflector 22 is likewise configured to reflect the light into the liquid-crystal panel 2, but to retroreflect the component of light orthogonal to the direction of reflection. The retroreflector acts like a lens which provides unit magnification imaging regardless of optical path length. If the length of the variable optical path 21 is made, by appropriate addressing of the second panel 25, always to equal the length from the first retroreflector 22 to the selected line, then it can be arranged that the video projectors 1 always come to focus on the selected line.

Figure 10:
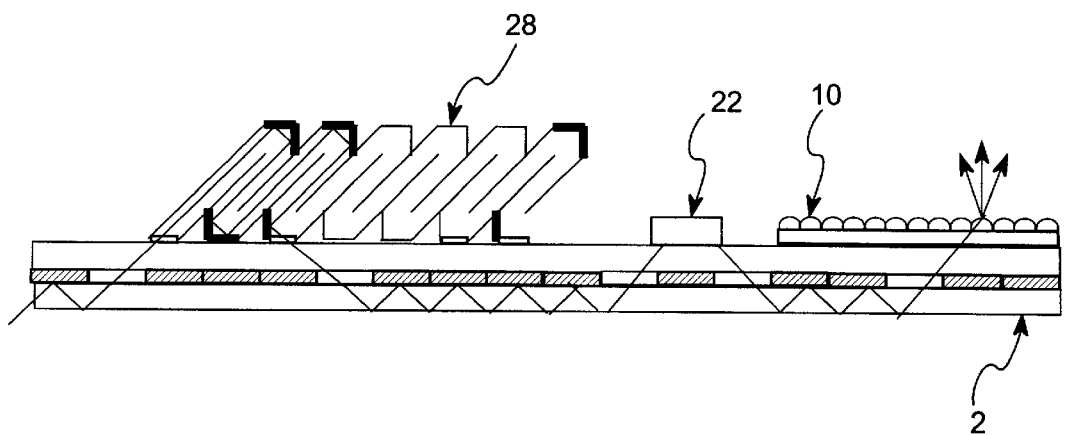
FIG. 10 shows another way of creating a variable optical path length.

The variable optical path length 21 may alternatively comprise several waveguides of differing lengths and means for re-routing light through various of these waveguides. FIG. 10 shows two such waveguides 28 with the light routed through the shorter of the two, in the manner of an optical trumpet. The light is then reflected off the one-dimensional retroreflector 22 and passes into the main body of the liquid-crystal panel 2 from which it is emitted at the selected line. The advantage of this alternative is that the same liquid-crystal panel 2 can be used for displaying the image and for providing a variable optical path length 21.

Figure 11:
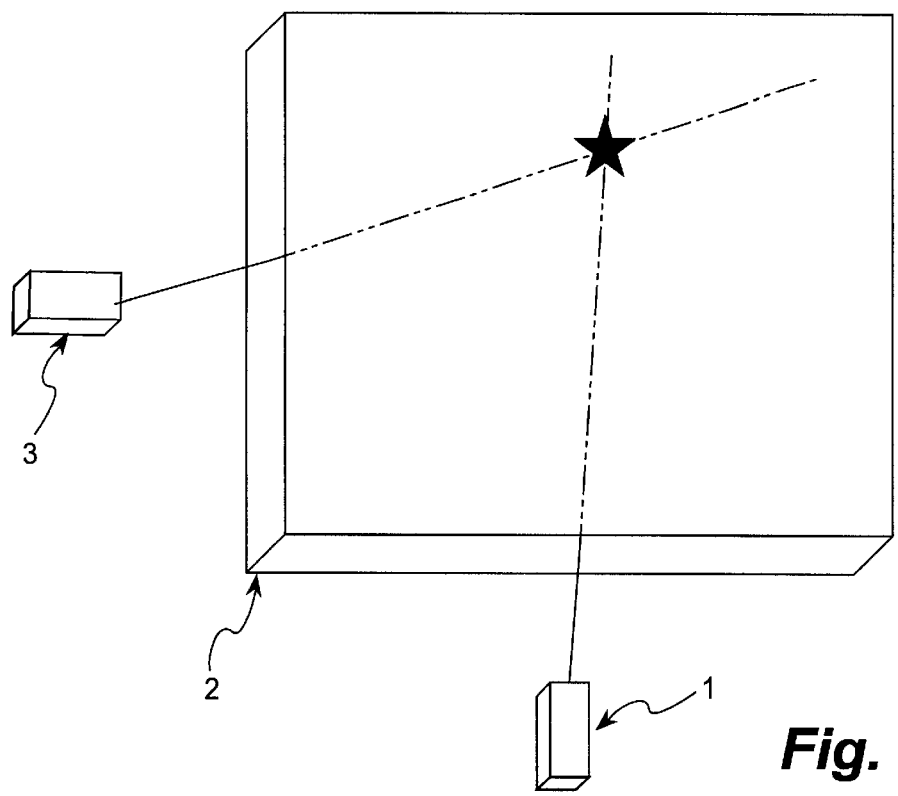
FIG. 11 shows a fourth embodiment in the form of a flat-panel display where a two-dimensional image is created by scanning the intersection of two rays.

A further embodiment of the display, as shown in FIG. 11, comprises a laser and one-dimensional scanner 1, a second laser and one-dimensional scanner 3 and a flat layer of material 2, such as $Er^{3+}$-doped $CaF_2$, which emits light at the point where the two laser beams intersect in proportion to the intensity of the laser beams. The two-dimensional picture is written pixel by pixel onto the flat layer of material by raster scanning the point where the laser beams intersect and modulating the lasers.

Figure 12:
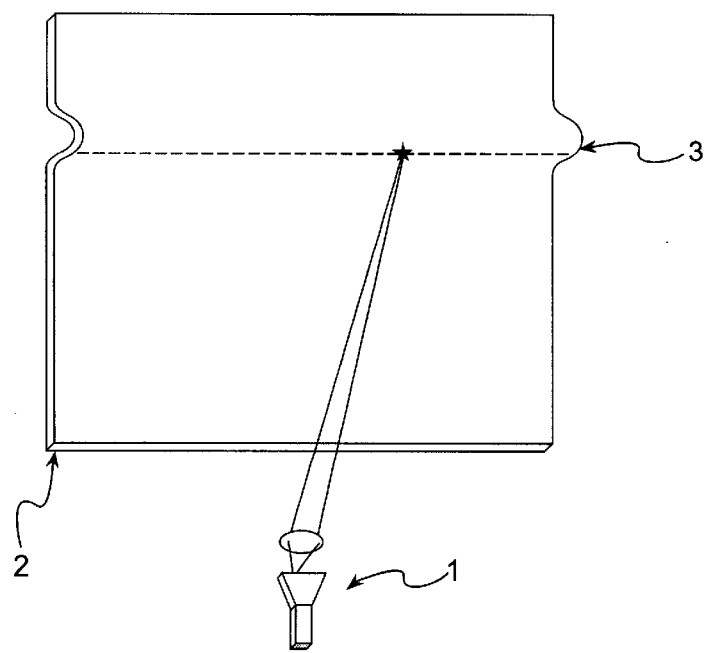
FIGS. 12 and 13 show fifth and sixth embodiments, namely flat-panel displays where a two-dimensional image is created by scanning a travelling wave with a one-line video projector.

A further embodiment of the display, FIG. 12, comprises a cathode ray tube and projection lens 1, a sheet of reflective foil 2, and a transducer which can create solitary horizontal surface waves in the foil 3. The transducer creates a single wave and the projection lens images the cathode ray tube onto the wave. The front of the wave reflects light from the cathode ray tube into the viewer's eyes so that the viewer sees an image of the cathode ray tube line at the position of the wave. As the wave travels down the screen the cathode ray tube writes further lines of the picture until the whole is complete, then a new wave is set up by the transducer ready to write the next frame.

Figure 13:
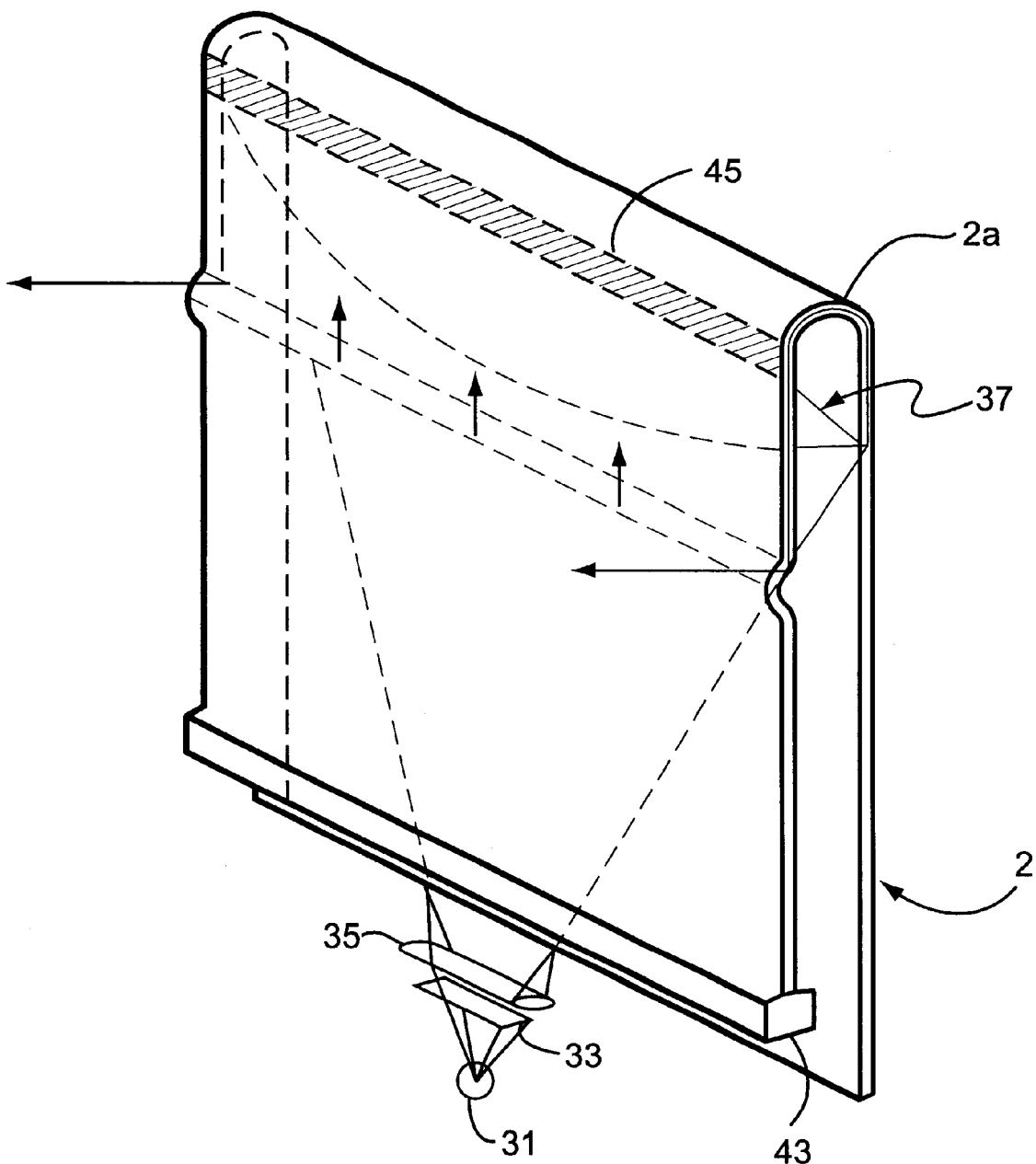

FIG. 13 shows a yet further embodiment in which the slab waveguide 2 is in the form of a transparent sheet folded over on itself to produce a tall inverted U-section. Instead of light being reflected off the surface of the slab it is fed in at one end of the U, remaining in the slab by TIR, and is extracted from the slab by the presence of a localised surface wave. Thus light from an arc lamp (or some other point source) 31 is focused by a cylindrical lens 35 into a slab waveguide 2. Meanwhile it is modulated in azimuth as it spreads out by a spatial light modulator 33. This produces a set of diverging rays in the plane of the waveguide, each ray at the intensity of a pixel in the current line. The rays are collimated by the optical lens 37, go round the curve 2a, then are scattered by the surface wave into the viewer's eyes.

The surface wave 41 is set up by the surface wave transducer 43 and propagates up the slab wave-guide until it is absorbed by the surface wave damper 45. Meanwhile pixels are addressed onto the surface wave by the optical system so that a picture is built up line by line. The wave could be of an S-shape instead of a simple bump in cross-section.

Further embodiments and variations are possible as follows.

Examples of a one-dimensional video projector 1 are a lens with the following approximately in the focal plane; a one-line cathode ray tube, a one-line spatial light modulator such as a line of deformable mirrors and a screen scanned by a laser. The ray can be a ray of light, a sound wave or a surface wave.

Examples of means for modulating the intensity and direction of a ray are as follows: a modulator and near-field scanner, a modulator and far-field spatial light modulator, a beam expander, and spatial light modulator and projection lens.

Examples of a flat layer of material which is not opaque to the ray and enables the emission of light at the point where the ray intersects a selected zone of the material are as follows: a flexible mirror with a surface wave which reflects light, a flexible slab waveguide with a surface wave whose radius of curvature causes light to be emitted, a slab waveguide with a photoelastic core such as perspex or urethane rubber in which an acoustic wave causes the emission of light, a two-photon absorption material which absorbs light at the point of intersection of two laser beams and thereupon emits light, a slab waveguide with a liquid-crystal cladding layer which reflects light along the guide in one state and transmits it in the other, a sheet of cylindrical lenslets spinning about an axis in the plane of the sheet in parallel with the axis of the lenslets.

Examples of a one-line three-dimensional display 11 are a one-line liquid-crystal hologram, a one-line acousto-optic hologram, a one-line high volume display, a one-line display and lenslet array, a one-line liquid-crystal display with lens and scanning spot source of light in the focal plane of the lens. If holograms are used then some of the lenses in the embodiments shown become redundant.

Examples of a variable optical path length include a movable mirror (i.e. the optical equivalent of a trombone) and a device which switches light between different lengths of waveguide (i.e. the optical equivalent of a trumpet).

What is claimed is:

1. A display of the flat-panel type, comprising a source (1) of one or more rays, means for modulating the intensity of the rays, a panel (2) which is not opaque to the rays and enables the emission of light at some position along each ray when the ray is directed into a side of the panel, and means (3) for selecting such positions;
   wherein the display includes a projector (1), containing the means for modulating the intensity of the rays, for modulating the input rays line by line for input into the panel, and the selecting means correspondingly selects one line at a time on the panel so as to display that line from the projector.

2. A flat-panel display as in claim 1, wherein the rays are of visible light, and the emission of light from the panel (2) is brought about by deflection of the rays at the selected position.

3. A flat-panel display as in claim 2, wherein the panel includes a reflective sheet and a transducer (43) for producing a localised linear acoustic or surface wave in the sheet (2), the presence of the wave at a given position causing reflection of the ray and thus the said deflection at that position.

4. A flat-panel display as in claim 3, wherein the means for selecting the position of deflection is adapted to cause the transducer (43) to excite the acoustic or surface wave and to wait until it reaches the required position before the ray is emitted.

5. A flat-panel display as in claim 2, wherein on one side of the panel (2) is a layer (4) which is switchably reflective or transparent, and the means for selecting the position at which the deflected rays are emitted from the panel is adapted to change the state of the switchable layer at a time.

6. A flat-panel display as in claim 1, wherein the projector means is adapted to produce a one-line three-dimensional display and to this end comprises a set of individual one-line projectors (1), each of which is adapted to display a line of the image seen at a different (azimuthal) angle, the rays from each of these one-line projectors being emitted from the panel at the corresponding azimuthal angle.

7. A flat-panel display as claim 1, in which the or each projector is formed as a row of addressable pixels parallel to the said edge of the panel.

8. A display of the flat-panel type, comprising a source (1) of one or more rays, means for modulating the intensity of the rays, a panel (2) which is not opaque to the rays and enables the emission of light at some position along each ray when the ray is directed into a side of the panel, and means (3) for selecting such positions, wherein the display is adapted to produce a three-dimensional image and to this end comprises a ray-projecting device (1), for directing the modulated rays into the panel at various azimuthal angles, the rays being emitted from the panel as they are selected by the selecting means (3) at respective azimuthal angles corresponding to their angle of entry into the panel.

9. A flat-panel display as in claim 8, further including means for applying a variable optical path length, the optical path including a retro-reflector, in such a way that the total optical path length between the retro-reflector and the respective line on the panel, minus the optical path length between the retroreflector and the ray source, remains approximately constant.

10. A flat-panel display as in claim 9, wherein the variable-length optical path includes a transparent layer (25) for total internal reflection, on one side of which is a layer that is switchably reflective or transparent.

11. A display of the flat-panel type, comprising a source (1) of one or more rays, means for modulating the intensity of the rays, a panel (2) which is not opaque to the rays and enables the emission of light at some position along each ray when the ray is directed into a side of the panel, and means (3) for selecting such positions, wherein the panel includes a reflective sheet and a transducer (43) for producing a localised linear acoustic or surface wave in the sheet (2), the presence of the wave at a given position causing reflection of the ray and thus the said selection of that position.

12. A method of displaying an image, in which light making up successive lines of the image is directed into the side of a panel containing a flat layer (2) of modulatable material, and the material is addressed a line at a time to modulate it and thus to cause emission over the plane of the layer so as to build up the image.

* * * * *